United States Patent [19]
Knowles et al.

[11] 3,752,608
[45] Aug. 14, 1973

[54] BEARING FOR PUMPS

[75] Inventors: Martin Knowles, Bromsgrove; Harold Lucas Tulloch, Solihull, both of England

[73] Assignee: Joseph Lucas (Industries) Limited, Birmingham, England

[22] Filed: Nov. 23, 1971

[21] Appl. No.: 201,438

[30] Foreign Application Priority Data
Nov. 28, 1970   Great Britain .................. 56,649/70

[52] U.S. Cl. .............................................. 418/131
[51] Int. Cl. ............................................ F01c 19/08
[58] Field of Search ........................... 418/131, 132

[56] References Cited
UNITED STATES PATENTS
2,660,958  12/1953  Laack ................................ 418/131
2,887,064  5/1959  Say ..................................... 418/131
3,558,247  1/1971  Gaertner ............................ 418/131
3,664,777  5/1972  Aoki ................................... 418/131

FOREIGN PATENTS OR APPLICATIONS
1,067,552  5/1967  Great Britain ..................... 418/131

Primary Examiner—C. J. Husar
Attorney—Holman & Stern

[57] ABSTRACT

A bearing arrangement for a gear pump has pairs of bearing elements on either side of a pair of meshed gears. The bearing elements lie in interpenetrating bores in the pump body and adjacent faces of the bearings are flat and are sealingly and adhesively secured together.

10 Claims, 3 Drawing Figures

BEARING FOR PUMPS

This invention relates to bearings for gear pumps, and has as an object to provide such bearings in a convenient form.

According to the invention there is provided a bearing arrangement for a pump in which liquid is displaced by rotation of a pair of meshed spur gears within interpenetrating bores in the pump body and comprising bearings engageable with the sides of the spur gears, each said bearing having a peripheral surface which lies within as associated bore and is formed with a flat face substantially parallel to the bearing axis, the flat faces of adjacent bearings being sealingly and adhesively secured together.

The invention also relates to a method of adhesively securing adjacent bearing faces in an arrangement as above defined.

Figure 1:
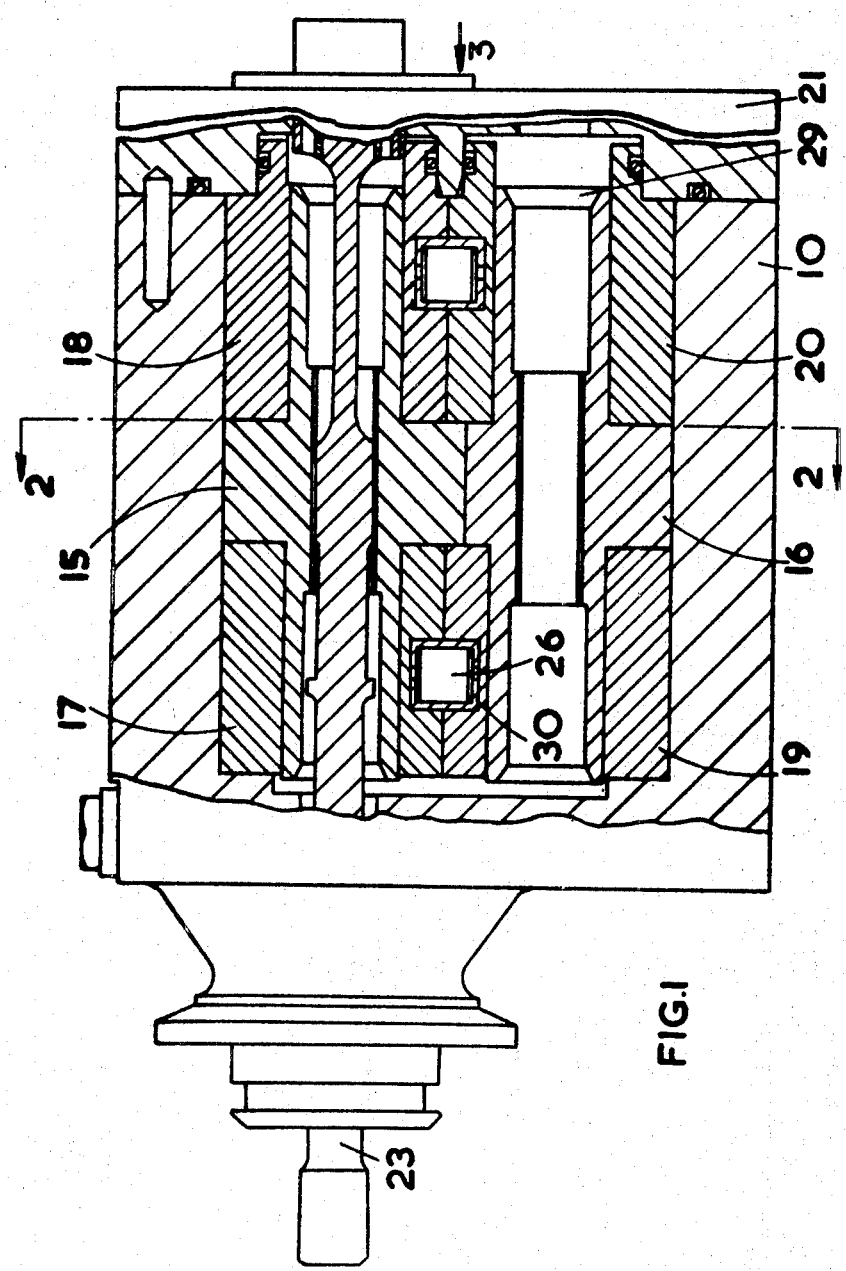
Figure 2:
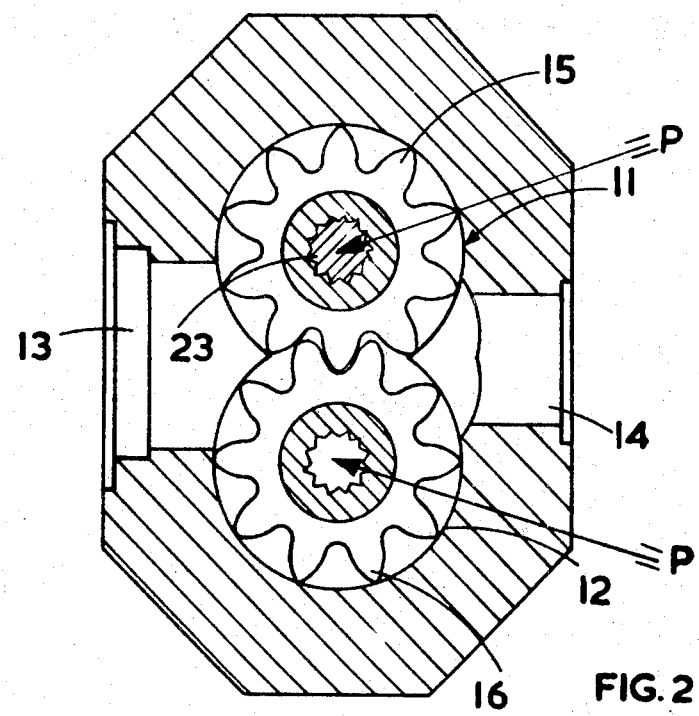
Figure 3:
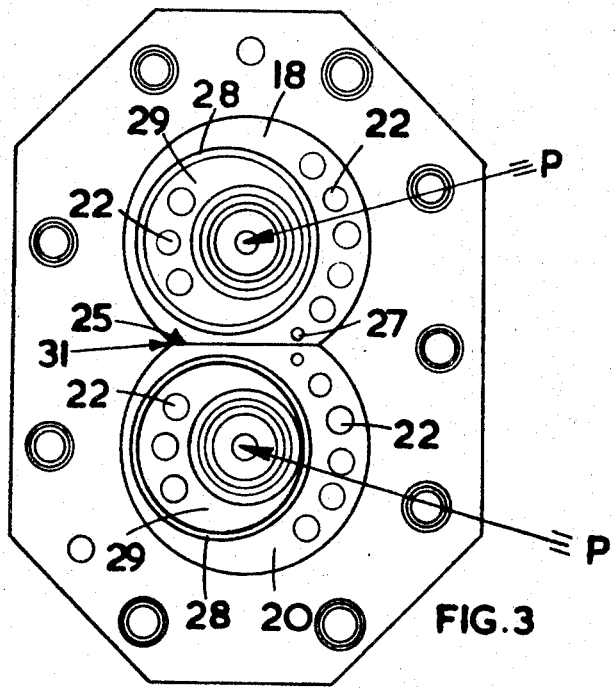

An example of the invention will now be described with reference to the accompanying drawings, in which:

FIG. 1 is a longitudinal section through a pump,
FIG. 2 is a secton on line 2—2 in FIG. 1 and
FIG. 3 is a view on arrow 3 in FIG. 1 and with parts removed.

A pump has a body 10 within which are a pair of interpenetrating bores 11, 12. An inlet 13 and an outlet 14 for the pump communicate with the bores 11, 12. Rotatable within bores 11, 12 are a pair of meshed spur gears 15, 16 having integral shaft portions. Spur gears 15, 16 respectively journalled in pairs of bearing members 17, 18 and bearing members 19, 20 located in the bores 11, 12. A cover member is sealingly secured to one end of the body 10. FIG. 3 is a view on arrow 3 with the cover member 21 removed.

Compression springs 22 are located within the bearing members 18, 20 and are engaged by the cover member 21 so that the bearing members 18, 17, 19 and 20 are urged into sealing engagement with the asociated sides of spur gears 15, 16. Bearing members 18, 20 are formed with passages 27 which communicate with outlet 14 so as to provide, in use, a pressure on the ends of bearings 18, 20 remote from the outlet 14. Sealing rings 28 isolate the passages 27 from low pressure zones 29 within the pump. Sealing rings 2 are disposed eccentrically of the axes of bearings 18, 20 so that pressure applied to the bearings via passages 27 opposes the pressure applied at the outlet 14. A drive shaft 23 extends sealingly through an end wall of the body 10 and is in splined engagement with the gear 15.

Each bearing member has a part-cylindrical circumference 24 and is also shown, formed with a flat face 2 extending parallel to the bearing axis. The faces 25 of adjacent bearings members lie in close proximity. Pairs of bearing members 17, 19 and 18, 20 are mutually located by dowels 26, each of which has a surrounding pair stainless steel plugs 30. Bearing member pairs 17, 19 and 18, 20 are also sealing secured together by adhesive between the adjacent faces 25.

Typically the bearing members are machined so as to provide a gap of about two thousandths of an inch between adjacent faces 25.

Preferably an acrylic ester adhesive, as for example Loctite Grade CVX, is used to tack the mating bearings together the bearings being assembled into the pump after application of the adhesive at discrete locations on the faces 25. After curing at room temperature the bearings are removed from the pump and the remaining space between faces 25 is filled with any acrylic ester sealant, as for example Loctite Grade AAV. "Loctite" is marketed by Douglas Kane Sealants and is a trade name of the Loctite Corporation. Alternatively the mating bearings may be secured together by other adhesives and sealants as for example, epoxy resins.

In use, pressure at outlet 14 is substantially higher than pressure at inlet 13. Since the outlet pressure extends for a short distance around the bores 11, 12 from the outlet 14, the lines of action of the resultant forces on the gears 15, 16 are as shown by arrows in FIGS. 2 and 3.

These forces cause the line of intersection 31 of the bores 11, 12 to provide a wedging action tending to separate the faces 25 of adjacent bearings and thereby provide a leakage path for fluid under pressure. Separation of the faces 25 is, however, prevented by the adhesive and sealant therebetween.

We claim:

1. A bearing arrangement for a pump in which liquid is displaced by rotation of a pair of meshed spur gears within interpenetrating bores in the pump body and comprising bearings engageable with the sides of the spur gears, each said bearing having a peripheral surface which lies within an associated bore and is formed with a flat face substantially parallel to the bearing axis, the flat faces of adjacent bearings being sealingly and adhesively secured together.

2. A bearing arrangement as claimed in claim 1 in which includes dowels which mutually locate adjacent bearings.

3. A bearing arrangement as claimed in claim 2 which includes a metal plug surrounding each said dowel.

4. A bearing arrangement as claimed in claim 1 in which said flat face of adjacent bearings are in spaced relationship.

5. A bearing arrangement as claimed in claim 1 in which the said adjacent bearing faces are adhesively secured with a synthetic resin.

6. A bearing arrangement as claimed in claim 5 in which the said synthetic resin is an acrylic ester.

7. A bearing arrangement as claimed in claim 5, in which the said synthetic resin is an epoxy resin.

8. A method of securing together the adjacent faces faces of a pair of bearings which form part of a bearing arrangement including a body having a pair of substantially parallel interpenetrating bores, said bearings being located in said bores respectively and each bearing having a flat face substantially parallel to the bearing axis, said flat faces being sealingly and adhesively secured together, comprising the steps of applying an adhesive to said faces at discreet location thereon, maintaining the bearings in their required relative positions until said adhesive is secured and subsequently filling the spaces between the adhesive with a sealant.

9. A method as claimed in claim 8 in which the bearings are maintained in their relative positions by assembling the bearings into said bores.

10. A method as claimed in claim 9, in which said adhesive is cured at room temperature.

* * * * *